United States Patent [19]

Jones

[11] 4,012,207
[45] Mar. 15, 1977

[54] EMULSION TREATER

[75] Inventor: Jeffrey A. Jones, Taft, Calif.

[73] Assignee: Chanslor-Western Oil and Development Company, Sante Fe Springs, Calif.

[22] Filed: Apr. 5, 1976

[21] Appl. No.: 673,588

[52] U.S. Cl. .................................. 55/174; 55/45; 55/175
[51] Int. Cl.² ........................................ B01D 19/00
[58] Field of Search ................ 55/42, 45, 171–176

[56] References Cited

UNITED STATES PATENTS

| | | | |
|---|---|---|---|
| 2,868,312 | 1/1959 | Erwin | 55/174 |
| 3,389,536 | 6/1968 | Bull | 55/174 |
| 3,708,960 | 1/1973 | Christopher, Jr. et al. | 55/174 X |

*Primary Examiner*—Frank A. Spear, Jr.
*Assistant Examiner*—Richard W. Burks
*Attorney, Agent, or Firm*—Frederick E. Mueller

[57] ABSTRACT

An oil/water emulsion, such as oil well production, is treated to recover its oil phase at pipe line specifications by passing the emulsion through an emulsion treater tank to an oil recovery zone in the tank. The emulsion flow path is through successive horizontal emulsion preheating, direct heating, post heating and settling zones of the tank while removing vapor from the top of the zones and water from the bottom of the zones. Water and gas are thus removed from the emulsion in the preheating zones prior to direct heating of the emulsion in the direct heating zone to reduce heat loss and fouling of the emulsion heating means in the direct heating zone, and additional separation of the emulsion phases occurs in the post heating zone prior to final phase separation in the settling zone to improve the settling action. The heating and settling zones have a unique, horizontally folded, generally sinuous configuration which provides a maximum emulsion flow path length through the zones and hence maximum phase separation in the zones for a given tank size.

22 Claims, 4 Drawing Figures

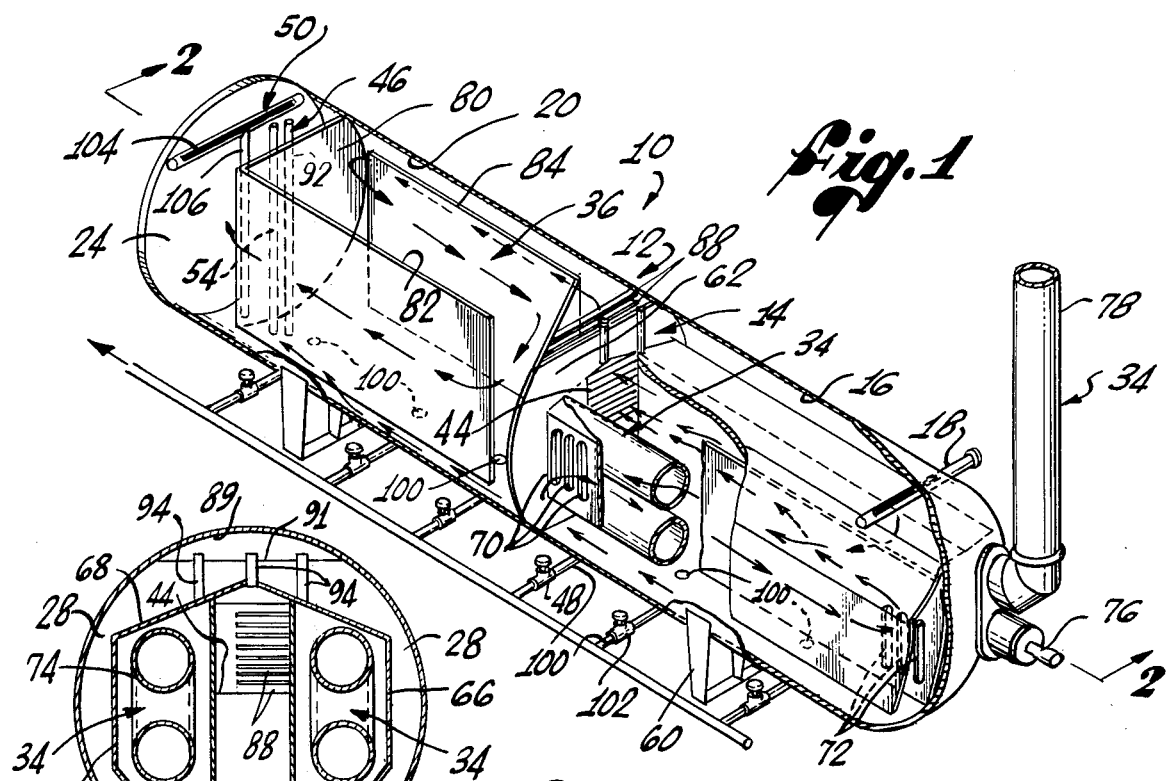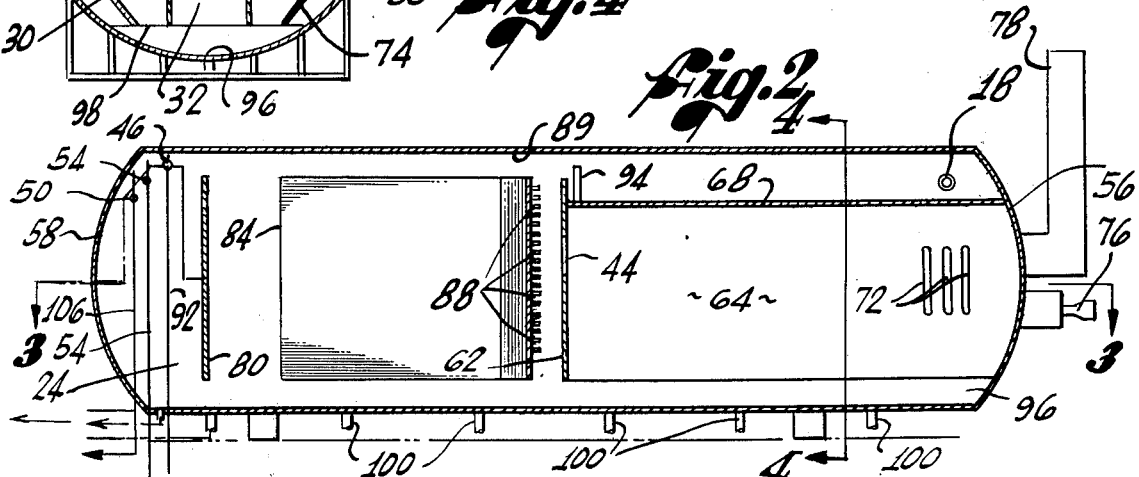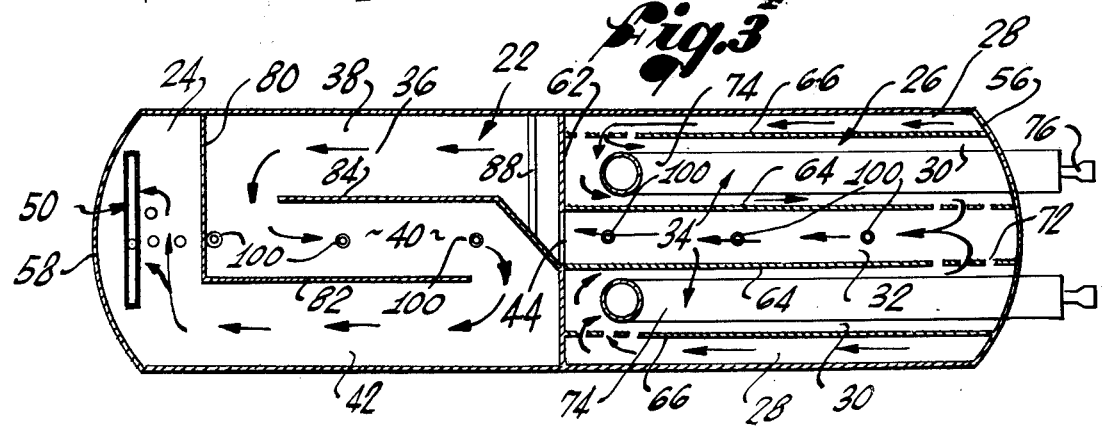

EMULSION TREATER

BACKGROUND OF THE INVENTION

1. Field

This invention relates generally to emulsion treaters and, more particularly, to an improved emulsion treater for oil/water emulsion such as oil well production.

2. Prior Art

As will appear from the ensuing description, the present emulsion treater may be utilized to treat a variety of oil/water emulsions. The primary application of the emulsion treater, however, is treating oil well production to recover its oil phase at pipeline specifications. For this reason, the invention will be described in this particular context.

The output from a producing oil well, commonly referred to in the oil refining trade as oil well production or crude, is a gas-bearing emulsion composed of crude oil and impurities in the form of water or brine, entrapped gas and solid matter. An initial step in the crude oil recovery process involves treatment of this emulsion or crude, after virtually all of its free water has been knocked out and so-called finishing additives have been added to the crude, to segregate the impurities from the crude oil and reduce its impurity content, which may initially run as high as 10% or more, to a level such that the crude oil meets so-called pipe line specifications. The apparatus used to accomplish this treatment is referred to as an emulsion treater or emulsion treater tank.

The prior art is replete with a vast assortment of such emulsion treaters, examples of which are described in the following U.S. Pat. Nos. 3,389,536; 3,672,127, 3,312,044, 2,713,919.

The present invention is concerned particularly with oil well emulsion or production treaters of the kind whose emulsion treatment process involves heating the incoming crude to initiate segregation of its gas, crude oil and water phases, additional stratification of the phases by a settling action, and extraction of the segregated oil phase.

The mechanics of this emulsion treatment process and the existing emulsion treaters for carrying out the process are well understood and hence need not be explained in elaborate detail. Suffice it to say that the emulsion treaters comprise an elongate horizontal treater tank into which the crude is introduced, generally at the top of the tank, and then heated. This heating of the crude reduces its viscosity and expands the entrapped gas, thereby causing the production and expansion of gas bubbles which rise to the top of the tank. Release of the entrapped gas from the incoming crude increases its density, whereby the crude gravitates downwardly in the treater tank as it flows through the heating zone of the tank. The reduction in viscosity of the crude produced by heating also initiates segregation or stratification of its oil and water phases, release of solid impurities from the crude, and gravitation of the water and solid impurities to the bottom of the tank.

After heating, additional stratification of the oil and water phases and separation of solid impurities is accomplished by a settling action to provide at the bottom of the tank a layer or stratum of water and solid impurities, above the water a layer or stratum of relatively impurity free crude oil, and above the oil a gas or vapor region.

SUMMARY OF THE INVENTION

This invention provides an improved oil/water emulsion treater of the character described which accomplishes separation of the emulsion phases in a more efficient and effective manner and thereby permits recovery of higher quality oil. The improved emulsion treater has an elongate horizontal treater tank containing baffle means defining an emulsion heating chamber at one end of the tank, an emulsion settling chamber at the other end of the tank, and an emulsion flow path for conducting emulsion from an emulsion inlet of the heating chamber to an oil recovery zone in the settling chamber through heating and settling zones in the chambers, respectively. The emulsion is heated in the heating chamber to effect initial separation of its gas, water and oil phases, and then directed through the settling zone, where final phase separation or stratification occurs, to the oil recovery zone from which the oil phase is extracted. The vapor evolved in these several zones is removed from the top of the zones and the water released in the zones is removed from the bottom of the zones. Oil is extracted from an intermediate level of the oil recovery zone.

According to one feature of the invention, the emulsion flow path has a horizontally folded generally sinuous portion in the heating chamber comprising successive horizontal segments of the path forming emulsion preheating, direct heating, and post heating zones, respectively. These zones are disposed in parallel, horizontally side by side heat transfer relation with each direct heating zone located between a preheating zone and a post heating zone and communicating at one end with the adjacent preheating zone and at the other end with the adjacent post heating zone, such that emulsion undergoes sinuous flow through the heating zones. Each direct heating zone contains emulsion heating means.

Preheating of the emulsion in the preheating zone initiates separation from the emulsion of water, entrapped gas, and solid impurities which are removed from the preheating zones. The emulsion then enters the direct heating zones with a reduced water and gas content. This initial removal of gas and water in the preheating zones reduces heat loss, permits more efficient heating of the emulsion in the direct heating zones, and reduces fouling of the emulsion heating means in the latter zones because of the lowered water content of the emulsion. Additional stratification of the oil and water occurs in the post heating zone, after which the emulsion enters the settling zone. The novel folded sinuous configuration of the emulsion flow path through the heating zones provides a maximum path length and hence maximum emulsion residence time and phase separation in the heating zones for a given treater tank size.

According to another feature of the invention, the emulsion flow path includes a second horizontally folded generally sinuous portion in the settling chamber providing the settling zone. This settling zone comprises a plurality of successive horizontal segments of the flow path disposed in parallel horizontally side by side relation with one outer segment opening at one end to the post heating zone, the other outer segment opening at one end to the oil recovery zone, and each intermediate segment opening at one end to one adjacent segment and at the other end to the other adjacent segment. This folded configuration of the emulsion flow path through the settling zone provides a maximum path length, and hence maximum emulsion residence time and oil/water stratification, in the settling zone and recovery of higher quality oil.

The vapor and water removal means of the emulsion treater comprise vapor and water collection regions extending along the top and bottom, respectively, of the treater tank from the heating chamber to the settling chamber, and vapor and water outlets from these regions. According to a feature of the invention, the tank has a number of water outlets spaced along the lower water collection region and controlled by valves which may be programmed to open periodically and sequentially. Oil is extracted from the oil recovery zone through an outlet opening at the intermediate level of the oil stratum in the zone.

BRIEF DESCRIPTION OF THE DRAWINGS

FIG. 1 is a perspective view of a presently preferred embodiment of an emulsion treater according to the invention with the parts broken away for the sake of clarity.

FIG. 2 is a longitudinal vertical section through the emulsion treater taken on line 2—2 in FIG. 1.

FIG. 3 is a longitudinal horizontal section through the emulsion treater taken on line 3—3 in FIG. 2.

FIG. 4 is a transverse section through the emulsion treater taken on line 4—4 in FIG. 2.

DESCRIPTION OF THE PREFERRED EMBODIMENT

Referring to the drawings, the illustrated emulsion treater 10 has an elongate emulsion treater tank 12 to be disposed in a normal position with its longitudinal axis generally horizontal. Within the tank are baffle means 14 defining an emulsion heating chamber 16 at one end of the tank having an emulsion inlet 18, an emulsion settling chamber 20 at the other end of the tank, and an emulsion flow path 22 for conducting emulsion from the inlet to an oil recovery zone 24 in the settling chamber. Emulsion flow path 22 includes a horizontally folded, generally sinuous portion 26 within the heating chamber 16. This folded portion of the path comprises successive normally generally horizontal segments of the path forming emulsion preheating, direct heating, and post heating zones 28, 30, 32, respectively. Heating zones 28, 30, 32 are disposed in parallel horizontally side by side heat transfer relation with each direct heating zone 30 located between a preheating zone 28 and a post heating zone 32. Emulsion inlet 18 opens to and is located adjacent the upstream ends of preheating zones 28. The upstream end of each direct heating zone 30 communicates with the downstream end of the adjacent preheating zone. The downstream end of each direct heating zone communicates with the upstream end of the post heating zone. Each direct heating zone 30 contains an emulsion heating means 34.

Emulsion flow path 22 includes a second horizontally folded, sinuous portion 36 in the settling chamber 20 forming an emulsion settling zone. Settling zone 36 comprises successive, normally generally horizontal segments 38, 40, 42 of the flow path disposed in parallel horizontally side by side relation with segment 40 between segments 38, 42. The upstream end of segment 38 opens to the downstream end of post heating zone 32 through an opening 44 in the baffle means 14. The downstream end of segment 42 opens to the oil recovery zone 24.

Vapor and water removal means 46, 48 are provided for removing vapor from the top and water and solid impurities from the bottom of the heating zones 28, 30, 32, the settling zone 36, and the oil recovery zone 24. Oil removal means 50 are provided by extracting oil from an intermediate level of the oil recovery zone. Within the oil recovery zone is an overflow 54.

Briefly, in operation of the emulsion treater 10, emulsion entering through the inlet 18 flows, in sinuous fashion, through the preheating, direct heating, and post heating zones 28, 30, 32 in succession, then through the opening 44 and the settling zone 36, to the oil recovery zone 24. Heating of the emulsion in the heating zones reduces the oil viscosity, effects release of gas from the emulsion, and initiates separation or stratification of the oil and water as well as settling out of solid impurities. The emulsion then flows through opening 44 into the settling zone 36. Final stratification of the oil and water and settling out of solid impurities occurs during flow of the emulsion through the settling zone to the oil recovery zone 24. Evolved gas and vapor are exhausted from the top of the several zones through the vapor removal means 46. Water and solid impurities are drained from the bottom of the zones through the water removal means 48. Oil is extracted from the oil-rich stratum within the oil recovery zone through the oil removal means 50.

Referring now in more detail to the illustrated emulsion treater, the treater tank 12 is a cylindrical tank with dome-shaped end walls 56, 58. Secured to the bottom of the tank are legs 60 for supporting the tank in its normal, generally horizontal position. Baffle means 14 includes a transverse partition 62 fixed within the tank 12 between and defining with the tank end walls 56, 58, the heating chamber 16 and settling chamber 20. Extending between and joined at their ends to the partition 62 and end wall 56 are generally parallel and upright longitudinal baffles 64, 66. The two inner baffles 64 are flat and located at opposite sides of the longitudinal axis of the tank. The two outer baffles 66 are located between and in spaced relation to the inner baffles and the sides of the tank. The lower portions of these outer baffles incline inwardly toward their adjacent inner baffles, as shown, to conform generally to the lower side wall curvature of the tank.

The upper edges of the inner baffles 64 are located in a common horizontal plane a distance below the top of the tank 12. The upper edges of the outer baffles 66 are located in a common horizontal plane a distance below the upper edges of the inner baffles. The lower edges of all the baffles are located in a common horizontal plane a distance above the bottom of the tank.

The two inner baffles 64 define therebetween the post heating zone 32. The two outer baffles 66 and their adjacent inner baffles define therebetween the direct heating zone 30. The side walls of the tank 12 and the adjacent outer baffles define therebetween the preheating zones 28. The tops of the direct and post heating zones 30, 32 are closed by a peaked top baffle top 68 which is secured to the upper edges of the longitudinal baffles 64, 66, and extends between and is joined at its ends to the tank partition 62 and end wall 56.

The inner end of each preheating zone 28, that is the end adjacent partition 62, communicates to the inner end of the adjacent direct heating zone 30 through vertical slot-like openings 70 in the intervening outer baffle 66. The opposite, or outer end of each direct heating zone communicates to the outer end of the post heating zone 32 through vertical slot-like openings 72 in the intervening inner baffle 64. The emulsion inlet 18 is a longitudinally slotted tube extending transversely across the interior of tank 12 over the top baffle 68 and adjacent the outer ends of the preheating zones 28.

Emulsion heating means 34 comprise heating tubes having generally U-shaped folded portions 74 which extend through the tank end wall 56 and longitudinally through the full length of the direct heating zones 30. Combustible gas is supplied to the heating tubes through nozzles 76 projecting into open ends of the tubes, as shown, and is burned in the tubes to generate heat. The heating tubes have upwardly directed exhaust ends 78 through which the burned gas is exhausted.

Baffle means 14 also comprises a transverse wall 80 in the settling chamber 20 adjacent but spaced from the tank end wall 58 and generally parallel and upright longitudinal baffles 82, 84 extending endwise of the tank 12 between the latter wall and partition 62. Wall 80 is joined along one edge to one side of the tank (the upper side in FIG. 3) and has an opposite vertical edge spaced from the opposite tank side (the lower side of FIG. 3). The outer end of baffle 82 is joined to wall 80 along this latter wall edge and extends inwardly toward the partition 62. The inner end of baffle 82 is spaced from the partition. Longitudinal baffle 84 is located between baffle 82 and the upper tank side in FIG. 3 and is joined at its inner end to partition 62. The outer end of baffle 84 is spaced from wall 80. The inner end portion of baffle 84 inclines laterally of the tank 12 and is joined to the partition 62.

Longitudinal baffles 82, 84, and the sides of the tank 12 define the three segments 38, 40, 42, of the settling zone 36. The inner upstream end of segment 38 is spanned by horizontally disposed vertically spaced apart spreader bars 88 and opens to the inner downstream end of the post heating zone 32 through the opening 44 which is located in the partition 62. Spreader bars 88 span the emulsion flow path from below the oil/water interface to above this interface and induce a pressure drop to insure continued circulation without any stagnant pools. The outer ends of segments 38, 40 communicate through the gap between wall 80 and the outer end of longitudinal baffle 84. The inner ends of segments 40, 42 communicate through the gap between longitudinal baffle 82 and partition 62. The outer end of segment 42 opens to the space between tank end wall 58 and wall 80 which forms the oil recovery zone 24. The three segments together form the settling zone 36.

The upper edges of wall 80 and baffles 82, 84 are located in a common horizontal plane with the upper edge of partition 62 a distance below the top of tank 12. The lower edges of the wall and baffles are located in a common horizontal path with the lower edges of partition 62 and baffles 64, 66 a distance above the bottom of the tank.

The vapor removal means 46 of the emulsion treater comprises a vapor collection region 89 extending along the top of tank 12 from heating chamber 16 to the settling chamber 20 through an opening 91 at the top of partition 62 and a vapor outlet 92 from this region.

Preheating zones 28, settling zone 36, and oil recovery zone 24 open directly upward to this collection region. The direct heating and post heating zones 30, 32 open upwardly to the region through vents 94 on the top baffle 68. Vapor outlet 92 comprises a pipe extending upwardly through the oil recovery zone 24 into the vapor collection region 89.

Water removal means 48 comprises a water collection region 96 extending along the bottom of tank 12 from the heating chamber 16 to the settling chamber 20 through an opening 90 at the bottom of partition 62 and a plurality of water outlets 100 from and spaced along the region. In these outlets are valves 102, such as solenoid valves, adapted to be opened periodically and sequentially. All of the zones 28, 30, 32, 36, and 24 open downwardly directly to the water collection region.

Oil removal means 50 comprises a horizontal, troughlike oil outlet 104 mounted on the tank end wall 58. This oil outlet is located at an intermediate level of the oil recovery zone 24 and connects to an oil outlet pipe 106 extending to the outside of the tank 12. Overflow 54 comprises a pipe extending upwardly through the oil recovery zone to the normal surface level of liquid in the tank.

In the event the emulsion is oil well production, the incoming crude will have been previously processed to knock out virtually all of its free water and add the usual finishing additives. In operation of the emulsion treater, emulsion enters the heating chamber 16 through inlet 18 and flows inwardly and downwardly through the preheating zones 28, then outwardly through the direct heating zones 30, and finally again inwardly through the post heating zone 32 to the partition opening 44. Indirect heating of the emulsion within the preheating zones 28, by heat transfer from the direct heating zone 30, reduces the viscosity of the emulsion, releases entrapped gas in the emulsion, and initiates separation or stratification of the oil and water. The vapor evolved rises into the vapor collection region 89 and is removed. Water gravitates downwardly into the water collection region 96 and is removed as explained below. The emulsion thus enters the direct heating zones 30 with a reduced gas and water content. This results in reduced heat loss by removal of heat with the water and reduced fouling of the heating tubes 34 by the water during subsequent emulsion flow through the direct heating zones 30.

During its passage through the direct heating zones 30, the emulsion is further heated by direct contact with the heating tubes 34. This effects additional release of gas from the emulsion and stratification of the oil and water. Further release of gas and stratification of the oil and water occurs within the post heating zone 32. The gas and vapor evolved in these zones passes upwardly through the vents 94 into the vapor collection region 89 and is removed. Water released in the zones gravitates downwardly into the water collection region 96 and is removed.

The oil-rich emulsion flows from the post heating zone 32, through the partition opening 44, past the spreader bars, and into the settling zone 36 where final stratification of the oil and water occurs by a gravity settling action. Evolved gas and vapor and water are removed from this zone through the vapor and water collection regions 89, 96, as before. Accordingly, the emulsion entering the oil recovery zone 24 has an upper oil-rich stratum of oil from which oil is extracted through the oil outlet 104. This outlet is located at the proper level in the oil recovery zone to extract the oil. Because of the sinuous folded configuration of the heating zones 28, 30, 32 and the settling zone 36, the effective lengths of these zones for given tank size, and hence residence time of the emulsion in the zones are maximized. Accordingly, the oil extracted from the emulsion treater is relatively high quality oil, relatively free of impurities.

The water drain valves 102 are connected to a control circuit (not shown) for a periodic opening. This control circuit is programmed to periodically open the valves in sequence to drain water from the water collection region 96 in such a way as to maintain the proper emulsion level in the tank.

I claim:

1. An emulsion treater for oil/water emulsion, such as oil well production, comprising:
   an elongate emulsion treater tank to be disposed in a normal position with its longitudinal axis generally horizontal,
   baffle means within said tank defining an emulsion heating chamber at one end of the tank having an emulsion inlet to said chamber, an emulsion settling chamber at the other end of the tank, and an emulsion flow path for conducting emulsion from said inlet to an oil recovery zone in said settling chamber,
   said flow path including a horizontally folded, generally sinuous portion in said heating chamber comprising successive normally generally horizontal segments of said flow path forming emulsion preheating, direct heating, and post heating zones respectively, disposed in parallel, horizontally side by side heat transfer relation with each direct heating zone located between a preheating zone and a post heating zone and communicating at one end to the adjacent end of the preheating zone and at the other end to the adjacent end of the post heating zone, and said flow path further including a normally, generally horizontal portion in said settling chamber forming an emulsion settling zone,
   emulsion heating means within each direct heating zone,
   vapor removal means for exhausting vapor from the top of said zones,
   water removal means for draining water from the bottom of said zones, and
   oil removal means for extracting oil from an intermediate level of said oil recovery zone.

2. An emulsion treater according to claim 1 wherein:
   said post heating and settling zones communicate through an opening in said baffle means.

3. An emulsion treater according to claim 1 wherein:
   said emulsion heating zones extend lengthwise of said tank and are disposed side by side laterally of said tank.

4. An emulsion treater according to claim 3 wherein:
   said emulsion heating zones comprise a single post heating zone along the axis of said tank, a pair of direct heating zones at horizontally opposite sides of said post heating zone, and a pair of preheating zones between said direct heating zones and horizontally opposite sides, respectively, of said tank,
   said heating zones have inner ends adjacent said settling chamber and opposite outer ends,
   said emulsion inlet is located at and opens to the outer ends of said preheating zones,
   the inner end of each preheating zone communicates with the inner end of the adjacent direct heating zone,
   the outer end of each direct heating zone communicates with the outer end of said post heating zone, and
   the inner end of said post heating zone communicates with said settling zone.

5. An emulsion treater according to claim 4 wherein:
   said tank has an end wall at said one tank end closing the outer end of said heating zones,
   said baffle means comprises a transverse partition between said chambers, closing the inner ends of said heating zones, and longitudinal baffles extending endwise of said tank between said partition and end wall and separating the adjacent heating zones, and
   the inner end of said post heating zone opens to said settling zone through an opening in said partition.

6. An emulsion treater according to claim 5 wherein:
   said baffle means further comprises a top baffle extending between said partition and end wall over and joined to the upper edges of said longitudinal baffles and closing the top of said direct and post heating zones, and
   said emulsion inlet is located above said top baffle.

7. An emulsion treater according to claim 6 wherein:
   said vapor removal means comprises a collection region extending along the top of said tank from one chamber to the other, vapor outlet means from said region, said preheating, settling, and oil recovery zones opening upwardly to said region, and vent means on said top baffle communicating said direct and post heating zones to said region,
   said water removal means comprises a water collection region extending along the bottom of said tank from one chamber to the other, water outlet means from the latter region, and said zones opening downwardly to the latter region, and
   said oil removal means comprises an oil outlet opening to said oil recovery zone at said intermediate level of this latter zone.

8. An emulsion treater according to claim 7 wherein:
   said collection regions extend from one chamber to the other through openings at the top and bottom of said partition.

9. An emulsion treater for oil/water emulsion such as oil well production, comprising:
   an elongate emulsion treater tank to be disposed in a normal position with its longitudinal axis generally horizonal,
   baffle means within said tank defining an emulsion heating chamber at one end of the tank having an emulsion inlet to said chamber, an emulsion settling chamber, at the other end of the tank, and an emulsion flow path for conducting emulsion from said inlet to an oil recovery zone in said settling chamber,
   said flow path including a first horizontally folded, generally sinuous portion in said heating chamber and a second horizontally folded, generally sinuous portion in said settling chamber,
   said heating chamber portion of said flow path comprising successive normally generally horizontal segments of said path forming emulsion preheating, direct heating, and post heating zones, respectively, disposed in parallel horizontally side by side heat transfer relation with each direct heating zone located between a preheating zone and a post heating zone and communicating at one end to the adjacent end of the preheating zone and at the other end to the adjacent end of the post heating zone, said settling chamber portion of said flow path forming an emulsion settling zone and comprising successive normally generally horizontal segments of said path disposed in parallel horizontally side by side relation with each intermediate segment communicating at one end with the adjacent end of one adjacent segment and at the other end with the adjacent end of the other adjacent segment, emulsion heating means within each direct heating zone, vapor removal means for exhausting vapor from the top of said zones, water removal means for draining water from the bottom of said zones, and oil removal means for extracting oil from an intermediate level of said oil recovery zone.

10. An emulsion treater according to claim 9 wherein:

said post heating and settling zones communicate through an opening in said baffle means.

11. An emulsion treater according to claim 10 wherein:

said emulsion heating zones extend lengthwise of said tank and are disposed side by side laterally of said tank, and said settling zone flow path segments extend lengthwise of said tank and are disposed side by side laterally of said tank.

12. An emulsion treater according to claim 11 wherein:

said emulsion heating zones comprise a single post heating zone along the axis of said tank, a pair of direct heating zones at horizontally opposite sides of said post heating zone, and a pair of preheating zones between said direct heating zones and horizontally opposite sides, respectively, of said tank, said heating zones have inner ends adjacent said settling chamber and opposite outer ends, said emulsion inlet is located at and opens to the outer ends of said preheating zones, the inner end of each preheating zone communicates with the inner end of the adjacent direct heating zone, the outer end of each direct heating zone communicates with the outer end of said post heating zone, the inner end of said post heating zone communicates with said settling zone, said settling zone flow path segments have inner ends adjacent said heating chamber and opposite outer ends, the outer ends of said latter flow path segments are spaced from the adjacent tank end to define said oil recovery zone between said latter segment ends and said latter tank end, and the outer end of one of said latter flow path segments opens to said oil recovery zone.

13. An emulsion treater according to claim 12 wherein:

said tank has a first end wall at said one tank end closing the outer ends of said heating zones and a second end wall at said other tank end, said baffle means comprises a transverse partition between said chambers closing the inner ends of said heating zones and the inner ends of said settling zone flow path segments and containing said opening communicating said post heating and settling zones, a transverse wall closing the outer ends of said settling zone flow path segments except said one segment and spaced from said second tank end wall to define said oil recovery zone therebetween, first longitudinal baffles extending lengthwise of said tank between said partition and first tank end wall and separating the adjacent heating zones, and second longitudinal baffles extending lengthwise of said tank between said partition and transverse wall and separating the adjacent settling zone flow path segments, said one settling zone flow path segment is located along one side of said tank and said settling zone flow path segments include a second segment along the opposite side of said tank communicating at its inner end to the inner end of said post heating zone through said partition opening, and spreader bars extending across the inner end of said second settling zone flow path segment.

14. An emulsion treater according to claim 13 wherein:

said vapor removal means comprises a collection region extending along the top of said tank from one chamber to the other, vapor outlet means from said region, and said zones opening upwardly to said region, said water removal means comprises a water collection region extending along the bottom of said tank from one chamber to the other, water outlet means from the latter region, and said zones opening downwardly to the latter region, and said oil removal means comprises an oil outlet opening to said oil recovery zone at said intermediate level of the latter zone.

15. An emulsion treater according to claim 14 wherein:

said collection regions extend from one chamber to the other through openings at the top and bottom of said partitions.

16. An emulsion treater according to claim 15 wherein:

said water outlet means comprises a plurality of outlets spaced along said water collection region, and valves in said latter outlets, respectively, adapted to be opened periodically and consecutively.

17. An emulsion treater for oil/water emulsion, such as oil well production, comprising:

an elongate emulsion treater tank to be disposed in a normal position with its longitudinal axis generally horizontal, baffle means within said tank defining an emulsion heating chamber at one end of the tank having an emulsion inlet to said chamber, an emulsion settling chamber at the other end of said tank, and an emulsion flow path for conducting emulsion from said inlet to an oil recovery zone in said settling chamber, said flow path including a portion in said heating chamber forming an emulsion heating zone and a horizontally folded, generally sinuous portion in said settling chamber forming an emulsion settling zone comprising successive normally generally horizontal segments of said flow path disposed in parallel horizontally side by side relation with each intermediate segment communicating at one end with the adjacent end of one adjacent segment and at its other end with the adjacent end of the other adjacent segment, emulsion heating means for heating emulsion in said heating zone, vapor removal means for exhausting vapor from the top of said zones, water removal means for draining water from the bottom of said zones, and oil removal means for extracting oil from an intermediate level of said oil recovery zone.

18. An emulsion treater according to claim 17 wherein:

said settling zone flow path segments extend lengthwise of said tank in side by side relation laterally of the tank.

19. An emulsion treater according to claim 18 wherein:

said tank has an end wall at said other tank end, said flow path segments have inner ends adjacent said heating chamber and outer ends adjacent said tank end wall, said baffle means comprises a transverse partition between said chambers closing the inner ends of said flow path segments, a transverse wall closing the outer ends of all but one of said segments and spaced from said tank end wall to define said oil recovery zone between said walls, and longitudinal baffles extending lengthwise of the tank between said transverse wall and partition and separating the adjacent segments, and the outer end of said one segment opens to said oil recovery zone.

20. An emulsion treater according to claim 19 wherein:

said one flow path segment is located along one side of said tank, and said flow path segments include a second segment along the opposite side of said tank communicating at its inner end to said heating zone through an opening in said partition.

21. An emulsion treater according to claim 20 wherein:

said vapor removal means comprises a vapor collection region extending along the top of said tank from one chamber to the other, vapor outlet means from said region, and said zones opening inwardly to said region, said water removal means comprises a water collection region extending along the bottom of said tank from one chamber to the other, water outlet means from the latter region, and said zones opening downwardly to the latter region, and said oil removal means comprises an oil outlet opening to said oil recovery zone at said intermediate level of the latter zone.

22. An emulsion treater according to claim 21 wherein:

said collection regions extend from one chamber to the other through openings at the top and bottom of said partition.

* * * * *